Sept. 4, 1962
H. MAHN
3,052,171
LENS MOUNT FOR PHOTOGRAPHIC OR CINEMATOGRAPHIC OBJECTIVES
Filed Feb. 6, 1961
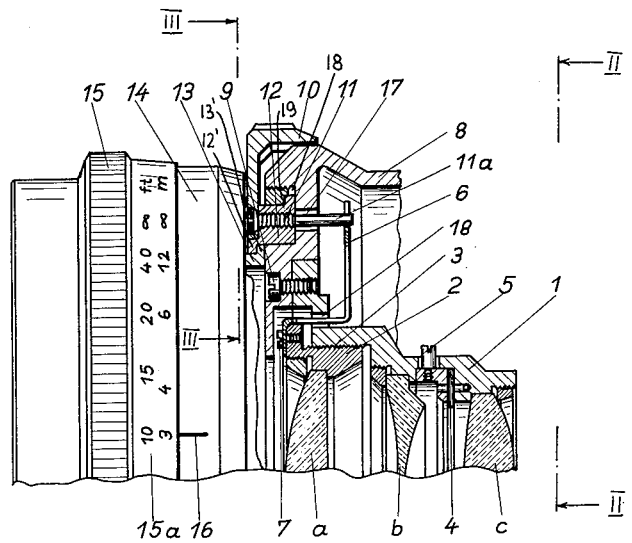
Fig. 1
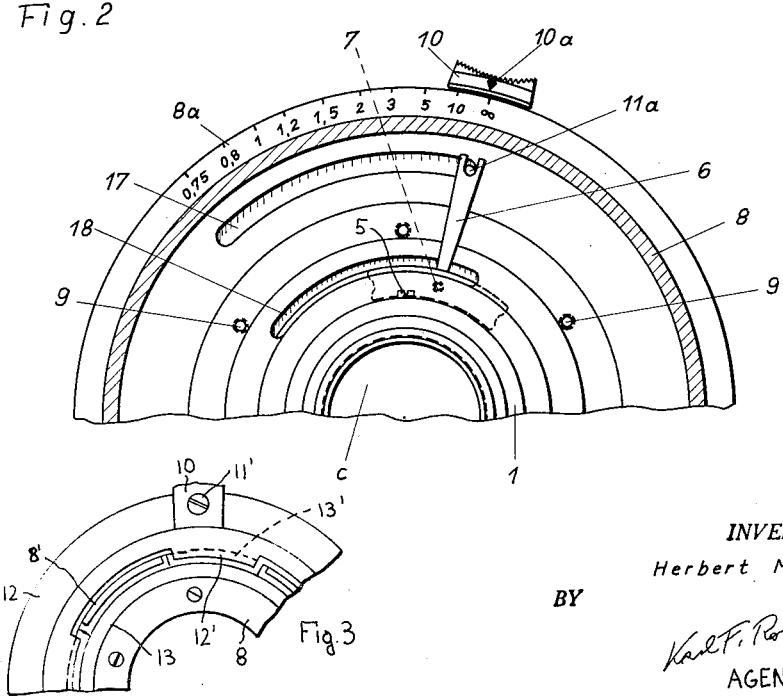
Fig. 2
Fig. 3
INVENTOR:
Herbert Mahn
BY
Karl F. Ross
AGENT

United States Patent Office 3,052,171
Patented Sept. 4, 1962

3,052,171
LENS MOUNT FOR PHOTOGRAPHIC OR CINEMATOGRAPHIC OBJECTIVES
Herbert Mahn, Bad Kreuznach, Germany, assignor to Jos. Schneider & Co., Optische Werke, Kreuznach, Germany, a corporation of Germany
Filed Feb. 6, 1961, Ser. No. 87,439
Claims priority, application Germany Feb. 16, 1960
7 Claims. (Cl. 95—45)

The present invention relates to a lens mount for optical objective systems, particularly for photographic or cinematographic cameras, adapted to have secured thereto an attachment for modifying the performance of a basic objective, e.g. by changing its effective focal length.

It is customary to provide such attachments with focusing means for adjusting the entire objective system in accordance with the distance of an object being photographed, such focusing means being calibrated for a predetermined setting of the basic objective (usually at infinity). If the basic objective has inadvertently been left at a different setting when the attachment was mounted thereon, the subsequent manipulation of the distance indicator of the attachment will result in an improper focusing of the camera.

It is, therefore, an object of my present invention to provide means for automatically and dependably giving the desired setting (preferably infinity) to the focusing control of the principal objective whenever a telephoto, wide-angle or other modifying attachment with separate focusing means is secured thereto.

This object is realized, in accordance with my present invention, through the provision of improved coupling means for removably securing the attachment to the basic objective, such coupling means including an element displaceable relatively to the objective support and an extension on said element so engageable with the focusing-control member of the objective as to entrain it to a predetermined position of adjustment by the same movement which couples the attachment to the support.

Though the relatively displaceable coupling element could be part of the attachment, I prefer to mount it on the objective support as a rotatable latching element adapted to hold the attachment in place thereon. More particularly, the latching element may be one half of a bayonet coupling whose mating other half is rigid with the attachment. When the parts are properly interconnected thereby, the principal objective will be focused at infinity, or at some other fixed limit of its range of adjustment, and the entire system will be focusable with the aid of a conventional distance indicator on the attachment itself.

The invention will be described in greater detail with reference to the accompanying drawing in which:

FIG. 1 is a fragmentary side-elevational view, partly in section, of a lens mount embodying the invention;

FIG. 2 is a partial rear view of the system taken on the line II—II of FIG. 1; and FIG. 3 is a fragmentary front view taken on the line III—III of FIG. 1.

The lens mount shown in the drawing comprises a stationary support 1 for an objective here shown to comprise a front lens $a$, a central lens $b$ and a rear lens $c$. Focusing of this objective is conventionally accomplished by the provision of a separate mounting ring 2 for front lens $a$, this ring being threadedly received in support 1 and being rotatable therein by means of a radially projecting setting rod 6 secured to it with the aid of one or more screws 7. A diaphragm 4, interposed between lenses $b$ and $c$, is adjustable by means of the usual control mechanism here represented by a radially projecting stud 5.

The lens support 1 is rigidly connected, via screws 9, to the housing of a camera partially illustrated at 8. The forward face of housing 8 is provided with an internally threaded annular recess 18 into which a retaining ring 19 is screwed to lock in position a rotatable ring 12 formed with bayonet teeth 12'. Housing 8 also has an arcuate slot 17 traversed by an extension 11a of a threaded bolt 11 which serves to fasten a handle 10 to the bayonet ring 12. The latter ring co-operates with a mating bayonet ring 13 having teeth 13', ring 13 being rigid with a front attachment 14 in which there is held a supplemental objective comprising one or more lenses not shown. Attachment 14 has a setting ring 15 for focusing the entire lens combination of the interconnected objective assemblies, ring 15 being provided with a distance scale 15a co-operating with a fixed pointer 16.

Handle 10 carries a pointer 10a which normally co-operates with a distance scale 8a on housing 8. The latter is formed with forwardly projecting crenelations 8' between which the bayonet teeth 13' of the attachment are receivable when the pin 11a rigid with latching ring 12 is moved to the left-hand end of slot 17 (FIG. 2) so that bayonet teeth 12' register with these crenelations. Next, the pin is moved to the other end of slot 17 so that teeth 12' overlie teeth 13' and lock them in place. Pin 11a is straddled by the bifurcate upper end of rod 6 which is entrained by this motion to bring about an axial displacement of ring 2 so that the principal objective $a, b, c$ is focused at infinity.

It is to be understood that the invention described and illustrated herein may be realized in various modifications without departing from the spirit and scope of the appended claims.

I claim:

1. A lens mount for an optical objective system, comprising a support for a basic objective, coupling means on said support for releasably securing thereto a supplemental objective co-operating with said basic objective, said coupling means including a latching ring rotatable between an attachment-releasing position and an attachment-locking position, adjustable focusing means for said basic objective on said support, and control means linking said ring with said focusing means for adjusting the latter to a predetermined focusing position.

2. A lens mount for an optical objective system, comprising a support for a basic objective, coupling means on said support for releasably securing thereto a supplemental objective co-operating with said basic objective, said coupling means including a latching ring provided with bayonet teeth and rotatable between an attachment-releasing position and an attachment-locking position, adjustable focusing means for said basic objective on said support, and control means linking said ring with said focusing means for adjusting the latter to a predetermined focusing position.

3. A lens mount for an optical objective system, comprising a support for a basic objective, coupling means on said support for releasably securing thereto a supplemental objective co-operating with said basic objective, said coupling means including a latching ring provided with bayonet teeth and rotatable between an attachment-releasing position and an attachment-locking position, adjustable focusing means for said basic objective on said support, and control means linking said ring with said focusing means for focusing the latter at infinity.

4. A lens mount for an optical objective system, comprising a support for a basic objective, an attachment including a supplemental objective co-operating with said basic objective, first and second bayonet rings on said support and on said attachment, respectively, releasably interlocking with each other, one of said bayonet rings being rotatable relatively to the other and to said support for disengaging said attachment from said support, focusing means for said basic objective on said support, and control means linking said one of said bayonet rings with said focusing means for adjusting the latter to a predetermined focusing position.

5. A lens mount for an optical objective system, comprising a support for a basic objective, an attachment including a supplemental objective co-operating with said basic objective, first and second bayonet rings on said support and on said attachment, respectively, releasably interlocking with each other, one of said bayonet rings being rotatable relatively to the other and to said support for disengaging said attachment from said support, principal focusing means for said basic objective on said support, ancillary focusing means for the combined objectives on said attachment, and control means linking said one of said bayonet rings with said principal focusing means for adjusting the latter to a predetermined focusing position.

6. A lens mount for an optical objective system, comprising a support for a basic objective, an attachment including a supplemental objective co-operating with said basic objective, first and second coupling means on said support and on said attachment, respectively, releasably interlocking with each other, one of said coupling means being rotatable relatively to the other and to said support for disengaging said attachment from said support, principal focusing means for said basic objective on said support, ancillary focusing means for the combined objectives on said attachment, and control means linking said one of said coupling means with said principal focusing means for focusing the latter at infinity.

7. A lens mount for an optical objective system, comprising a support for a basic objective, an attachment including a supplemental objective co-operating with said basic objective, first and second bayonet rings on said support and on said attachment, respectively, releasably interlocking with each other, one of said bayonet rings being rotatable relatively to the other and to said support for disengaging said attachment from said support, principal focusing means for said basic objective on said support, ancillary focusing means for the combined objectives on said attachment, and control means linking said one of said bayonet rings with said principal focusing means for focusing the latter at infiinity.

References Cited in the file of this patent

UNITED STATES PATENTS 2,995,074    Schmuck _____ Aug. 8, 1961